(12) United States Patent
Henshall et al.

(10) Patent No.: US 12,554,533 B2
(45) Date of Patent: Feb. 17, 2026

(54) ANALYTIC ENGINE FOR OPTIMALLY DISTRIBUTING WORK BETWEEN THREADS FOR DEPENDENCY-BASED SCHEDULING FOR CONCURRENT ONLINE ANALYTICS

(71) Applicant: Kinaxis INc., Ottawa (CA)

(72) Inventors: Dane Henshall, Ottawa (CA); Matt Diener, Ottawa (CA); Philippe Cadieux-Pelletier, Ottawa (CA); Nathaniel Stanley, Ottawa (CA); Rob MacMillan, Ottawa (CA)

(73) Assignee: Kinaxis, Inc., Ottawa (CA)

( * ) Notice: Subject to any disclaimer, the term of this patent is extended or adjusted under 35 U.S.C. 154(b) by 627 days.

(21) Appl. No.: 17/708,187

(22) Filed: Mar. 30, 2022

(65) Prior Publication Data

US 2022/0318054 A1 Oct. 6, 2022

Related U.S. Application Data

(60) Provisional application No. 63/167,808, filed on Mar. 30, 2021.

(51) Int. Cl.
| | |
|---|---|
| *G06F 9/48* | (2006.01) |
| *G06F 8/41* | (2018.01) |
| *G06F 9/38* | (2018.01) |
| *G06F 9/50* | (2006.01) |
| *G06F 16/901* | (2019.01) |
| *G06Q 10/0631* | (2023.01) |

(52) U.S. Cl.
CPC ............ *G06F 9/4881* (2013.01); *G06F 8/433* (2013.01); *G06F 9/3838* (2013.01); *G06F 9/5038* (2013.01); *G06F 9/5066* (2013.01); *G06F 16/9024* (2019.01); *G06F 9/3885* (2013.01); *G06Q 10/0631* (2013.01)

(58) Field of Classification Search
None
See application file for complete search history.

(56) References Cited

U.S. PATENT DOCUMENTS

| | | | |
|---|---|---|---|
| 7,664,728 B2 | 2/2010 | Wortendyke et al. | |
| 7,698,348 B2 | 4/2010 | Walker et al. | |
| 7,904,892 B2* | 3/2011 | Babb, II | G06F 8/75 |
| | | | 717/133 |
| 9,292,573 B2 | 3/2016 | Walker et al. | |

(Continued)

OTHER PUBLICATIONS

A. Abdolrashidi, D. Tripathy, M. E. Belviranli, L. N. Bhuyan and D. Wong, "Wireframe: Supporting Data-dependent Parallelism through Dependency Graph Execution in GPUs," 2017 50th Annual IEEE/ACM International Symposium on Microarchitecture (Micro), Boston, MA, USA, 2017, pp. 600-611. (Year: 2017).*

*Primary Examiner* — Abu Zar Ghaffari
(74) *Attorney, Agent, or Firm* — Ruggiero McAllister & McMahon LLC

(57) ABSTRACT

A system, method and non-transitory computer-readable storage medium for computing a full dependency graph before obtaining a result of an analytic; and constructing a scheduling graph to optimally distribute work between the available threads, based on the full dependency graph. This may include receiving a request for a result of an algorithm executed on a node; checking, by the processor, the algorithm for a secondary dependency algorithm and executing, by the processor, the algorithm on the node.

6 Claims, 11 Drawing Sheets

(56) References Cited

U.S. PATENT DOCUMENTS

| | | | |
|---|---|---|---|
| 10,474,663 B2 | 11/2019 | Gray et al. | |
| 10,496,528 B2 | 12/2019 | Hachmeister et al. | |
| 10,564,946 B1* | 2/2020 | Wagner | G06F 8/433 |
| 10,725,752 B1* | 7/2020 | Wagner | G06F 16/183 |
| 10,969,929 B2* | 4/2021 | Vadapandeshwara | G06F 9/465 |
| 11,442,784 B2* | 9/2022 | Sanchez | G06F 16/9024 |
| 2008/0275935 A1* | 11/2008 | Mohindra | H04L 67/51 |
| | | | 709/201 |
| 2011/0055484 A1* | 3/2011 | Eichenberger | G06F 9/3834 |
| | | | 712/216 |
| 2012/0180067 A1* | 7/2012 | Funaoka | G06F 8/456 |
| | | | 718/106 |
| 2014/0325516 A1* | 10/2014 | Ventroux | G06F 9/48 |
| | | | 718/102 |
| 2015/0016257 A1* | 1/2015 | Kumar | H04L 47/16 |
| | | | 370/235 |
| 2015/0358198 A1* | 12/2015 | Mahajan | H04L 67/60 |
| | | | 709/221 |
| 2018/0075158 A1* | 3/2018 | Li | G06F 16/9024 |
| 2018/0089002 A1* | 3/2018 | Xia | G06F 1/324 |
| 2018/0276040 A1* | 9/2018 | Hosmani | G06F 9/4843 |
| 2018/0314733 A1 | 11/2018 | Wen et al. | |
| 2019/0005108 A1* | 1/2019 | Bregler | G06F 16/2386 |
| 2019/0220321 A1* | 7/2019 | Yang | G06F 9/4881 |
| 2020/0073861 A1 | 3/2020 | Gray et al. | |
| 2020/0097333 A1* | 3/2020 | Jain | G06F 9/52 |
| 2020/0125238 A1* | 4/2020 | Vadapandeshwara | G06F 9/451 |
| 2020/0293916 A1* | 9/2020 | Li | G06F 9/5072 |
| 2020/0311076 A1* | 10/2020 | Lee | G06F 16/2456 |
| 2021/0263779 A1* | 8/2021 | Haghighat | G06F 9/5061 |
| 2022/0019476 A1* | 1/2022 | Sanchez | G06F 9/5038 |

* cited by examiner

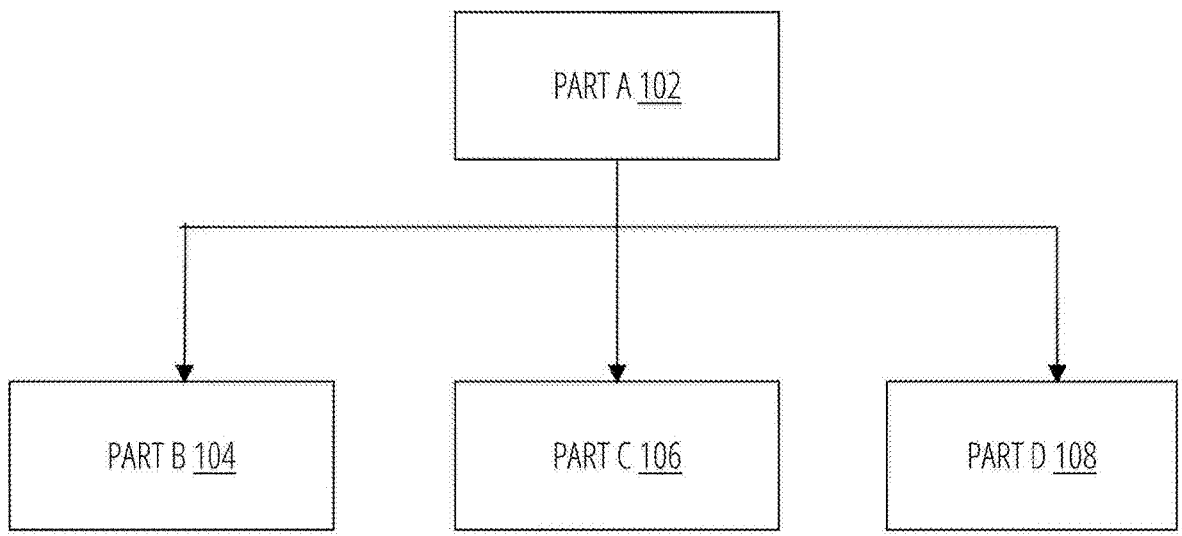
FIG. 1 RELATED TECHNOLOGY

SEQUENTIAL SCHEDULING

PARALLEL SCHEDULING

ANALYTIC ENGINE FOR OPTIMALLY DISTRIBUTING WORK BETWEEN THREADS FOR DEPENDENCY-BASED SCHEDULING FOR CONCURRENT ONLINE ANALYTICS

CROSS-REFERENCE TO RELATED APPLICATION

The present application claims the benefit of priority of U.S. Patent Application No. 63/167,808, filed on Mar. 30, 2021, the content of which is incorporated herein by reference.

BACKGROUND

An analytics engine may comprise the following: database tables that can have "calculated fields" that contain the results of complex algorithms; a calculated field that is attached to a specific record in a database table; a calculated field that may depend on the results of other calculated fields on other records; and one or more analytics algorithms that have access to the data as a graph in the form of references and sets.

For example, in some analytics engines dealing with supply chains, every part in a part table can have a cumulative lead time analytic that may be set as a "CumLeadTime" calculated field on the part table. To compute the cumulative lead time of a part, an algorithm iterates over a set of components as graph edges and uses their CumLeadTime results.

However, conventional computation of analytics requires extensive run-time. For example, consider the case of three processing units (or threads), each requesting the CumLeadTime on Part A, where the analytic requires the CumLeadTime of parts B, C, and D. Conventionally, all three threads independently obtain the CumLeadTime from Part A. That is, the first thread will run the full analytic, while the other two threads sit and wait for the first thread to finish, even though each thread could be working on parts C and D while the first thread works on Part B.

BRIEF SUMMARY

Disclosed herein are systems and methods that compute a full dependency graph, before attempting to fetch the result of an analytic, and from the full dependency graph, construct a scheduling graph to optimally distribute work between available threads.

The systems and methods disclosed herein, address a number of technical hurdles, as follows.

In order to mitigate the performance impact of computing dependencies, caching is used, while the scheduling graph is permitted to be an imperfect approximation of the true dependency graph.

In order to mitigate the performance impact of frequently looking up records in the scheduling graph, heuristics and instrumentation are used to only enable this feature on tables and calculated fields that are known to benefit from this feature.

In order to mitigate the performance impact of one thread working on an unnecessary job, threads are restricted to working on only the sub-graph that is needed for their associated user query.

In one aspect, a computer-implemented method includes computing, by a processor, a full dependency graph before obtaining a result of an analytic, and constructing, by the processor, a scheduling graph to optimally distribute work between available threads, based on the full dependency graph.

The computer-implemented method may also include receiving, by the processor, a request for a result of an algorithm executed on a node, checking, by the processor, the algorithm for a secondary dependency algorithm, calculating, by the processor, a dependency graph by recursively executing the dependency algorithm on the node, and parallel scheduling, by the processor, on the dependency graph to pre-calculate dependency results. The computer-implemented method may also include caching, by the processor, the dependency results. The computer-implemented method may further include executing, by the processor, the algorithm on the node.

The computer-implemented method may also include where executing the algorithm on the node includes calculating, by the processor, un-cached dependencies by the algorithm. Other technical features may be readily apparent to one skilled in the art from the following figures, descriptions, and claims.

In a further aspect, a computing apparatus includes a processor. The computing apparatus also includes a memory storing instructions that, when executed by the processor, configure the apparatus to compute, by a processor, a full dependency graph before obtaining a result of an analytic, and construct, by the processor, construct a scheduling graph to optimally distribute work between available threads, based on the full dependency graph.

The system may also be further configured to receive, by the processor, a request for a result of an algorithm executed on a node, check, by the processor, the algorithm for a secondary dependency algorithm, calculate, by the processor, a dependency graph by recursively executing the dependency algorithm on the node, and parallel schedule, by the processor, on the dependency graph to pre-calculate dependency results. The system may also include cache, by the processor, the dependency results. The system may also include executes, by the processor, the algorithm on the node.

When executing the algorithm on the node, the system may be further configured to calculate, by the processor, un-cached dependencies by the algorithm. Other technical features may be readily apparent to one skilled in the art from the following figures, descriptions, and claims.

In one aspect, a non-transitory computer-readable storage medium, the computer-readable storage medium including instructions that when executed by a computer, cause the computer to compute, by a processor, a full dependency graph before obtaining a result of an analytic, and construct, by the processor, construct a scheduling graph to optimally distribute work between available threads, based on the full dependency graph.

The non-transitory computer-readable storage medium may include further instructions, that when executed, cause the computer to receive, by the processor, a request for a result of an algorithm executed on a node, check, by the processor, the algorithm for a secondary dependency algorithm, calculate, by the processor, a dependency graph by recursively executing the dependency algorithm on the node, and parallel schedule, by the processor, on the dependency graph to pre-calculate dependency results. The system may also include cache, by the processor, the dependency results. The system may also include executes, by the processor, the algorithm on the node.

When executing the algorithm on the node, the non-transitory computer-readable storage medium may include further instructions, that when executed, cause the computer to calculate, by the processor, un-cached dependencies by the algorithm. Other technical features may be readily apparent to one skilled in the art from the following figures, descriptions, and claims.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE SEVERAL VIEWS OF THE DRAWINGS

To easily identify the discussion of any particular element or act, the most significant digit or digits in a reference number refer to the figure number in which that element is first introduced. Like reference numbers and designations in the various drawings indicate like elements.

FIG. 1 illustrates a tree structure of dependent analytics.

DETAILED DESCRIPTION

Figure 2A:
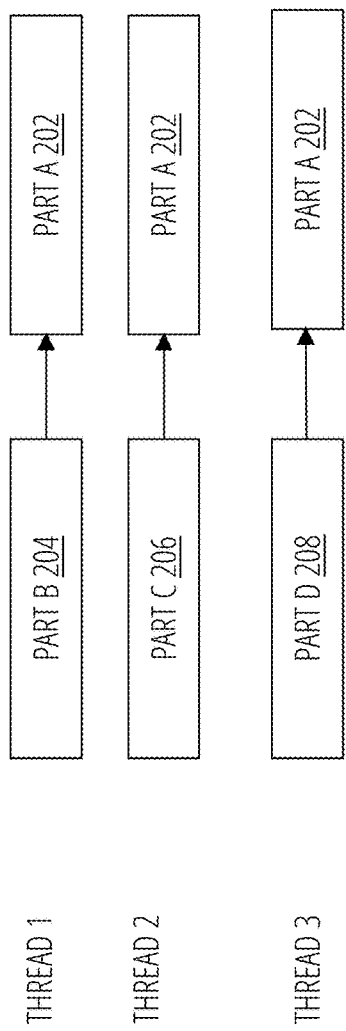
FIG. 2A illustrates a first approach to executing the series of dependent analytics in FIG. 1.

Aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable storage media having computer readable program code embodied thereon.

Any combination of one or more computer readable storage media may be utilized. A computer readable storage medium may be, for example, but not limited to, an electronic, magnetic, optical, electromagnetic, infrared, or semiconductor system, system, or device, or any suitable combination of the foregoing.

More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), a Blu-ray disc, an optical storage device, a magnetic tape, a Bernoulli drive, a magnetic disk, a magnetic storage device, a punch card, integrated circuits, other digital processing system memory devices, or any suitable combination of the foregoing, but would not include propagating signals. In the context of this document, a computer readable storage medium may be any tangible medium that can contain, or store a program for use by or in connection with an instruction execution system, system, or device.

Computer program code for carrying out operations for aspects of the present disclosure may be written in any combination of one or more programming languages, including an object oriented programming language such as Java, Python, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the disclosure may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the disclosure. However, the disclosure may be practiced without one or more of the specific details, or with other methods, components, materials, and so forth. In other instances, well-known structures, materials, or operations are not shown or described in detail to avoid obscuring aspects of the disclosure.

Aspects of the present disclosure are described below with reference to schematic flowchart diagrams and/or schematic block diagrams of methods, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a general purpose computer, special purpose computer, or other programmable data processing system to produce a machine, such that the instructions, which execute via the processor of the computer or other programmable data processing system, create means for implementing the functions/acts specified in the schematic flowchart diagrams and/or schematic block diagrams block or blocks.

These computer program instructions may also be stored in a computer readable storage medium that can direct a computer, other programmable data processing system, or other devices to function in a particular manner, such that the instructions stored in the computer readable storage medium produce an article of manufacture including instructions which implement the function/act specified in the schematic flowchart diagrams and/or schematic block diagrams block or blocks.

The computer program instructions may also be loaded onto a computer, other programmable data processing system, or other devices to cause a series of operational steps to be performed on the computer, other programmable system or other devices to produce a computer implemented process such that the instructions which execute on the computer or other programmable system provide processes for implementing the functions/acts specified in the flowchart and/or block diagram block or blocks.

The schematic flowchart diagrams and/or schematic block diagrams in the Figures illustrate the architecture, functionality, and operation of possible implementations of systems, methods and computer program products according to various embodiments of the present disclosure. In this regard, each block in the schematic flowchart diagrams and/or schematic block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer instructions.

A computer program (which may also be referred to or described as a software application, code, a program, a script, software, a module or a software module) can be written in any form of programming language. This includes compiled or interpreted languages, or declarative or procedural languages. A computer program can be deployed in many forms, including as a module, a subroutine, a stand-alone program, a component, or other unit suitable for use in a computing environment. A computer program can be deployed to be executed on one computer or can be deployed on multiple computers that are located at one site or distributed across multiple sites and interconnected by a communication network.

As used herein, a "software engine" or an "engine," refers to a software implemented system that provides an output that is different from the input. An engine can be an encoded block of functionality, such as a platform, a library, an object or a software development kit ("SDK"). Each engine can be implemented on any type of computing device that includes one or more processors and computer readable media. Furthermore, two or more of the engines may be implemented on the same computing device, or on different computing devices. Non-limiting examples of a computing device include tablet computers, servers, laptop or desktop computers, music players, mobile phones, e-book readers, notebook computers, PDAs, smart phones, or other stationary or portable devices.

The processes and logic flows described herein can be performed by one or more programmable computers executing one or more computer programs to perform functions by operating on input data and generating output. The processes and logic flows can also be performed by, and system can also be implemented as, special purpose logic circuitry, e.g., an FPGA (field programmable gate array) or an ASIC (application specific integrated circuit). For example, the processes and logic flows can be performed by, and systems can also be implemented as a graphics processing unit (GPU).

Computers suitable for the execution of a computer program include, by way of example, general or special purpose microprocessors or both, or any other kind of central processing unit. Generally, a central processing unit receives instructions and data from a read-only memory or a random access memory or both. A computer can also include, or be operatively coupled to receive data from, or transfer data to, or both, one or more mass storage devices for storing data, e.g., optical disks, magnetic, or magneto optical disks. It should be noted that a computer does not require these devices. Furthermore, a computer can be embedded in another device. Non-limiting examples of the latter include a game console, a mobile telephone a mobile audio player, a personal digital assistant (PDA), a video player, a Global Positioning System (GPS) receiver, or a portable storage device. A non-limiting example of a storage device include a universal serial bus (USB) flash drive.

Computer readable media suitable for storing computer program instructions and data include all forms of non-volatile memory, media and memory devices; non-limiting examples include magneto optical disks; semiconductor memory devices (e.g., EPROM, EEPROM, and flash memory devices); CD ROM disks; magnetic disks (e.g., internal hard disks or removable disks); and DVD-ROM disks. The processor and the memory can be supplemented by, or incorporated in, special purpose logic circuitry.

To provide for interaction with a user, embodiments of the subject matter described herein can be implemented on a computer having a display device for displaying information to the user and input devices by which the user can provide input to the computer (for example, a keyboard, a pointing device such as a mouse or a trackball, etc.). Other kinds of devices can be used to provide for interaction with a user. Feedback provided to the user can include sensory feedback (e.g., visual feedback, auditory feedback, or tactile feedback). Input from the user can be received in any form, including acoustic, speech, or tactile input. Furthermore, there can be interaction between a user and a computer by way of exchange of documents between the computer and a device used by the user. As an example, a computer can send web pages to a web browser on a user's client device in response to requests received from the web browser.

Embodiments of the subject matter described in this specification can be implemented in a computing system that includes: a front end component (e.g., a client computer having a graphical user interface or a Web browser through which a user can interact with an implementation of the subject matter described herein); or a middleware component (e.g., an application server); or a back end component (e.g. a data server); or any combination of one or more such back end, middleware, or front end components. The components of the system can be interconnected by any form or medium of digital data communication, e.g., a communication network. Non-limiting examples of communication networks include a local area network ("LAN") and a wide area network ("WAN").

The computing system can include clients and servers. A client and server are generally remote from each other and typically interact through a communication network. The relationship of client and server arises by virtue of computer programs running on the respective computers and having a client-server relationship to each other.

Currently, inefficient computation of analytics prevents from spreading the analytics work across as many threads as possible. Consider the trivial case of three threads (three processing units) requesting a cumulative lead time (CumLeadTime) for Part A 102, where the analytic requires the CumLeadTime of each of Part B 104, Part C 106 and Part D 108, as shown FIG. 1, which illustrates a tree structure of dependent analytics.

In FIG. 1, the full dependency graph of computing a metric associated with Part A 102, is shown. Part A 102 is calculated based, independently, on the values of Part B 104, Part C 106 and Part D 108. That is, each of Part B 104, Part C 106 ad Part D 108 must be calculated in order to calculate the value of Part A 102.

Figure 2B:
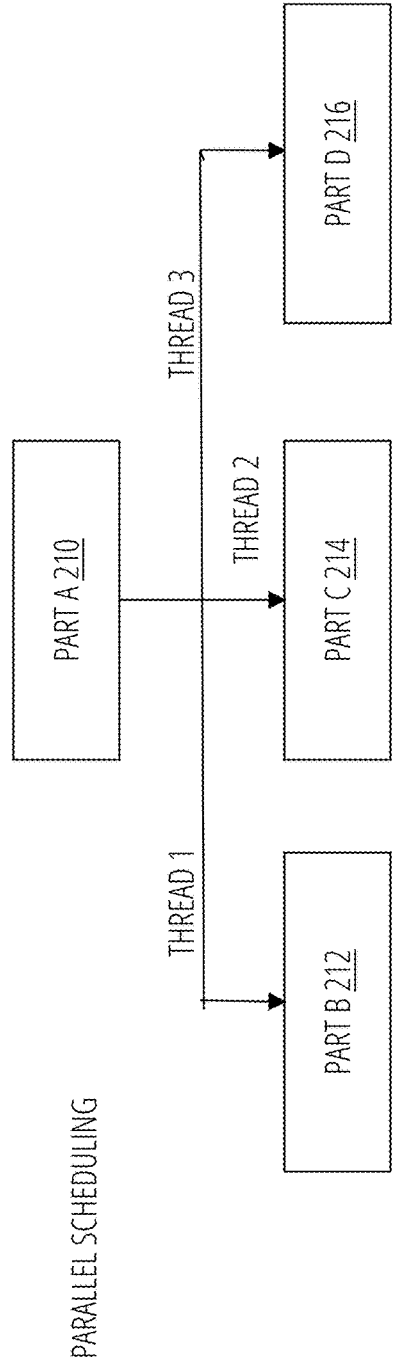
FIG. 2B illustrates a second approach to executing the series of dependent analytics in FIG. 1

Each of FIG. 2A and FIG. 2B illustrate respective ways of scheduling algorithms in order to calculate the value of Part A 102.

FIG. 2A illustrates a first approach to executing the series of dependent analytics in FIG. 1

In this example, all three threads are used to calculate the CumLeadTime of Part A 202. The first thread runs an analytic to calculate the CumLeadTime of Part B 204, while the other two threads remain idle and wait for the first thread to finish. Once the first thread is finished, first second runs an analytic to calculate the CumLeadTime of Part C 206, while the third thread remains idle. Finally, the third thread runs an analytic to calculate the CumLeadTime of Part D 208. This is a sequential execution of threads.

FIG. 2B illustrates a second approach to executing the series of dependent analytics in FIG. 1.

In FIG. 2B, the full dependency graph is computed before attempting to obtain the result of an analytic. From the full dependency graph, a scheduling graph is constructed to optimally distribute work between the available threads. In FIG. 2B, the first thread is Part A 210-Part B 212; the second thread is Part A 210-Part C 214; and the third thread is Part A 210-Part D 216. The threads are executed in parallel.

Algorithm Engine

In some embodiments, there is provided a custom-built database and algorithm engine built for efficient supply chain management system that uses scenarios for planning. A suite of planning algorithms is built on top of the engine. This suite calculates what to build and where to build for large global companies with complex products. Since these planning algorithms are built on top of the algorithm engine, users of the software have the ability to: create a private scenario, modify any data in the database in the isolation of the new scenario, and then observe the output of the algorithms and any other calculations. In some embodiments, there is a special class of algorithms that customers can develop and run in the algorithm engine.

The key to the performance of these algorithms is an ability to avoid recalculating parts of the plan that are not impacted by the data changed in the user's scenario, as well as the ability to make effective use of multiple CPU cores by calculating multiple parts of the plan in parallel. The new feature of the algorithm engine described herein provides a way for internal and customer algorithm developers to augment their main planning algorithms with fast supplementary algorithms that can be used by the engine to determine what calculations the algorithm is going to trigger in the scenario and, more importantly, what calculations the algorithm does not need to access. This information allows the engine to pre-calculate the data the algorithm is going to ask for in parallel beforehand, without doing extra calculations that are not needed in a user's scenario.

The systems and methods disclosed herein, support two main types of algorithms: a) very fast "Core Algorithms"; and b) a slower "Embedded Algorithms" that can also be developed by partners and customers. Users can generally interact with the system through spreadsheet-like workbooks or visualizations built on top of a workbook such as graphs, scorecards, or dashboards.

A feature of the system is the ability for users to create "scenarios" which allow them to interact with data and algorithms in their scenario without impacting other users, as disclosed, for example, in U.S. Pat. No. 9,292,573 issued Mar. 22, 2016, and incorporated herein by reference. This is similar in principle to a source control system; creating a scenario in the present system gives the user full control over much of the data in the database without the user having to worry about their changes impacting others. When the user is finished, the user can discard their changes by deleting their scenario, or they can commit their scenario into the base scenario which the user branched from.

Algorithms implemented using the present platform are not scenario aware—an algorithm developer is able to interact with the data and other algorithms without having to know that it is running in a "scenario". The algorithm simply accesses the data and the algorithm engine, which is aware of the current scenario, and provides the right data for that scenario.

The difficult part of this approach is making the algorithms as fast as possible—so that when a user interacts with a workbook, the user can create a scenario, make a change, and see how that change affects the output of associated algorithms in near real time. In order to make the algorithms as fast as possible, the network structure of supply chains is exploited and the algorithms are allowed to be implemented using recursion, where the algorithm engine handles the recursion.

Figure 3:
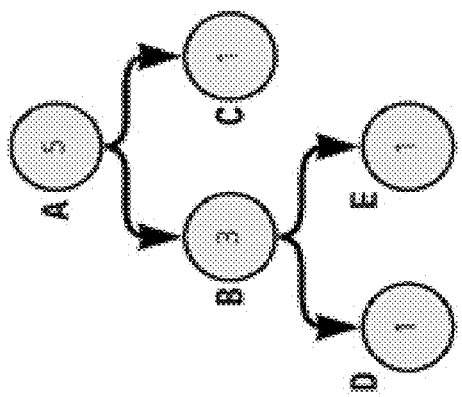
FIG. 3 illustrates recursive counting of nodes in a tree in accordance with one embodiment.

A simple example is counting nodes in a tree—the problem can be formulated in a recursive manner as shown in FIG. 3. This is similar in principle to how the algorithm appears when implemented in some embodiments. The power of the algorithm engine is in minimization of the amount of re-calculation that is executed in a new scenario.

Example—Cumulative Lead Time Algorithm

Figure 4:
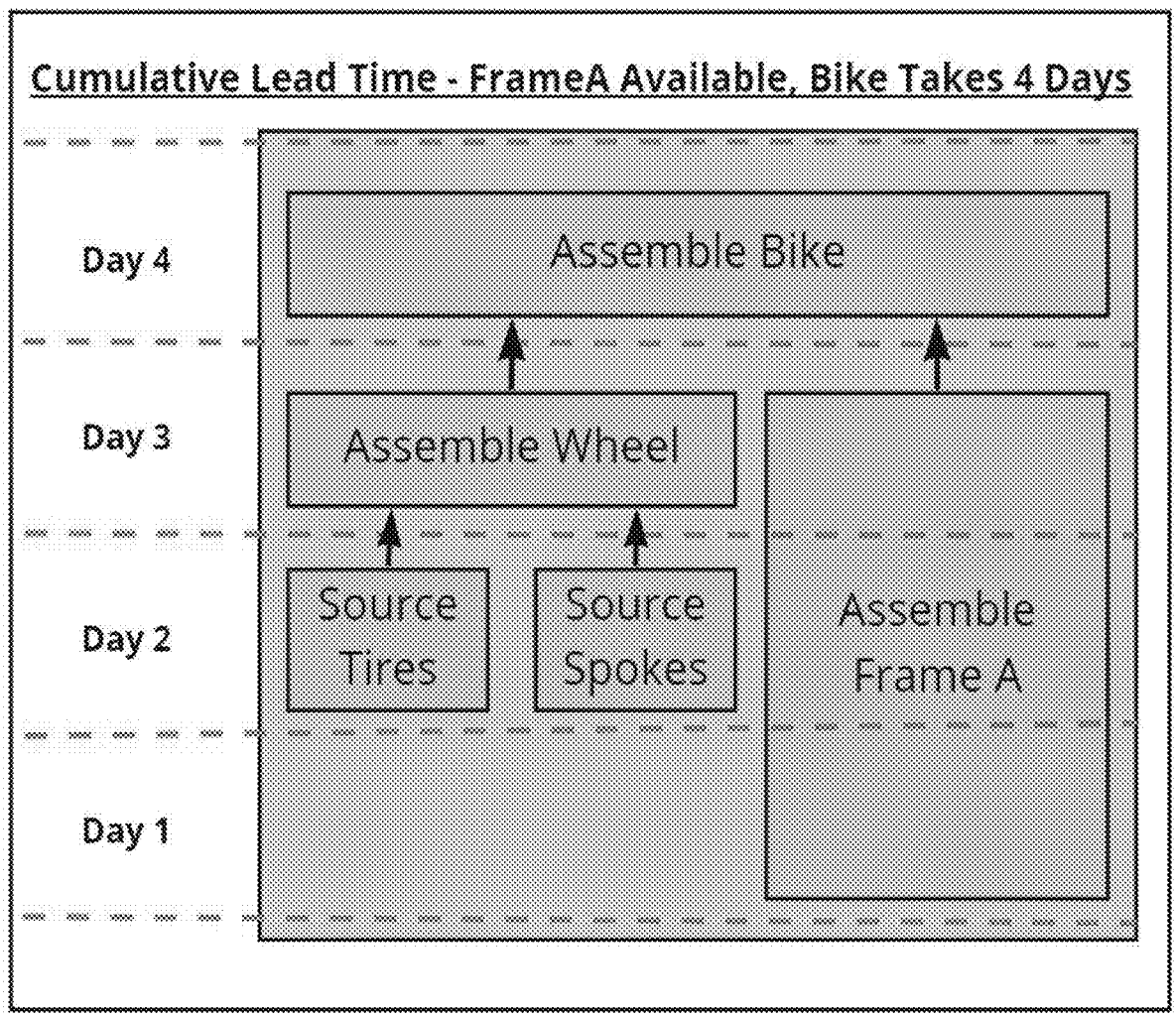
FIG. 4 illustrates a time frame for bike assembly in accordance with one embodiment.

FIG. 4 illustrates an example algorithm to demonstrate the logic. The cumulative lead time is an example of a supply chain algorithms that calculates an estimate of how long it takes to source a part without using any supply from inventory. The core of the business logic is to find out how long it will take to source all of the part's components, and then add the amount of time it takes to process those components.

For example, consider a simple bike that needs wheels, tires, spokes and a frame, as shown in FIG. 4.

According to FIG. 4, it takes I day to source tires, and I day to source spokes. It takes 1 day to assemble a wheel from the tires and spokes. Furthermore, it takes 3 days to assemble a frame for the bike. It then takes one day to assemble the bike from the assembled wheel and assembled frame. In all, it would take 4 days to assemble a bike, from all of the source components (tires, spokes and frame).

In practice, the process may not be as simple. For example, there may be multiple ways to source a frame, each of which takes a different amount of time. This is considered in FIG. 5, in which there are two sources of frames: Frame A and Frame B.

Figure 5:
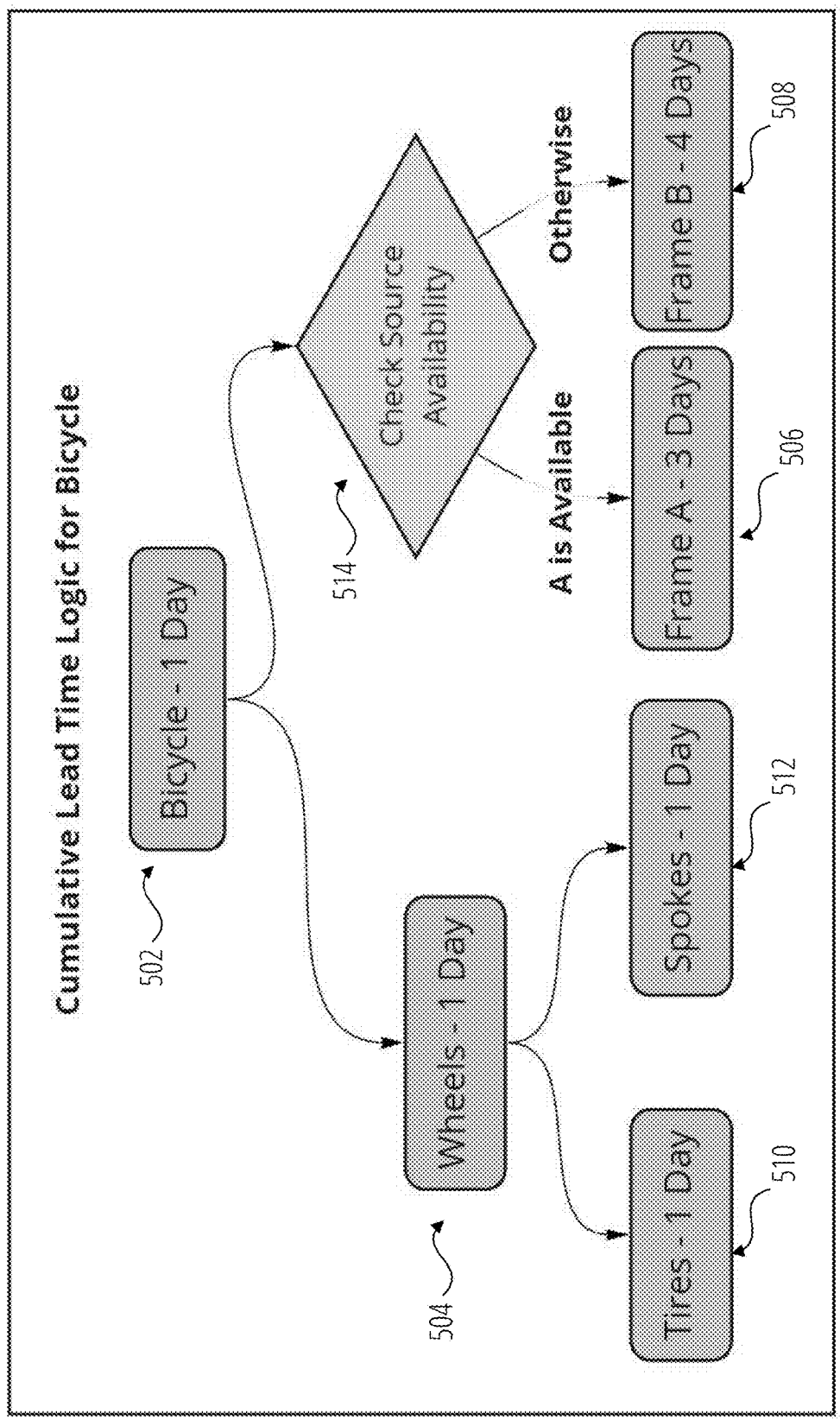
FIG. 5 illustrates logic for a bike assembly in accordance with one embodiment.

The logic for calculating the cumulative lead time has a natural graph structure as shown in FIG. 5, in which the assembly of two types of frames, Frame A and Frame B, are available.

An algorithm in the present framework is considered to be a graph where every node in the graph represents an executable unit and some nodes rely on data from other nodes in order to compute a metric at that node. For example, the root node 502 calculates the cumulative lead time of a bicycle. The root node 502, however, requires the cumulative lead time of two other sources: wheels and a frame. That is root node 502 relies on data from wheel node 504, and data from one of two frame nodes 506 and 508. Furthermore, wheel node 504 relies on data from each of tire node 510 and spokes node 512.

A mechanism already exists in the engine for algorithms to declare their dependencies for efficient scheduling. However, such a set of dependencies is generally a superset of the actual data the algorithm will use. The business logic of the algorithm, at execution time, may pick and choose what data it actually needs. As a result, it is not possible to know what subset of the declared dependencies will be used until the business logic actually executes. This is illustrated in FIG. 5, in which the sourcing of the frame is determined at the time of executing the business logic, based on decision block 514. Since Frame A takes less time to source, Frame A is the preferred option. However, this decision is based on the availability of Frame A, at the time of execution.

Figure 6:
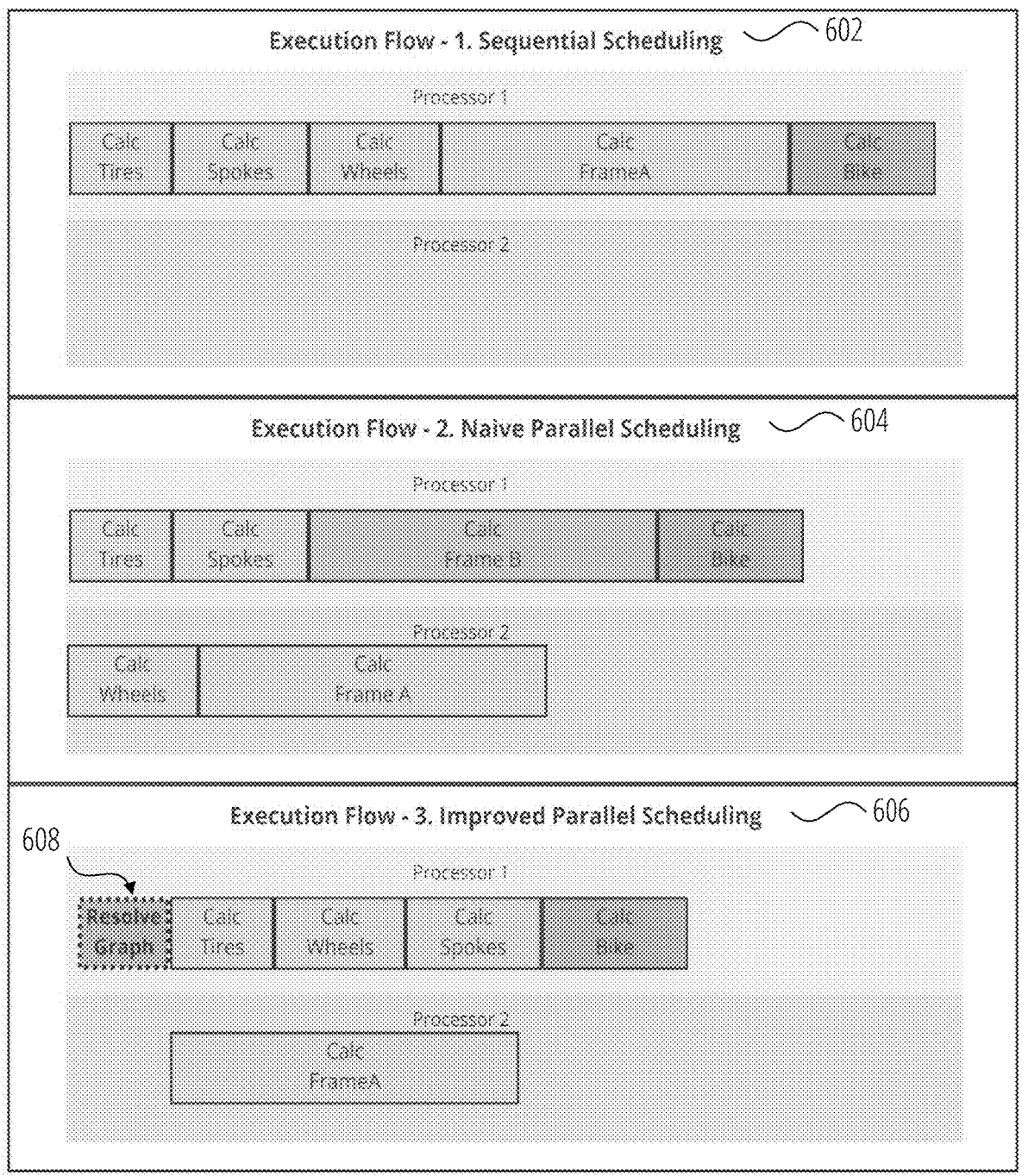
FIG. 6 illustrates execution of flow for three different types of scheduling, in accordance with one embodiment.

Consider the following three approaches, illustrated in FIG. 6, in the case where the business logic determines that Frame A is available so it does not need to know how long the lead time of Frame B is.

Sequential Scheduling 602: Execute in a breadth-first manner, where data is calculated only when it is needed. This ensures only data needed by the algorithm is calculated, but cannot be done effectively in parallel.

Naïve Parallel Scheduling 604: Resolve the graph using the declared dependencies, and calculate all of the nodes in the resolved graph. This enables the work to be spread across multiple processing units but may result in some nodes being calculated which are not needed. As can be seen, both the cumulative lead times of Frame A and Frame B are calculated, even though only one of these are necessary.

Improved Parallel Scheduling 606: Enable algorithms to implement a Resolve graph 608 step which is a fast subset of their business logic in order to give a more accurate resolved dependency graph. A key part of this is that the resolved graph is not required to be perfectly accurate, so an algorithm can return an approximation which can be aggressively cached and shared across versions.

The resolve graph 608 step can be implemented by providing an implementation of a secondary algorithm which has the same input requirements as the primary algorithm, However, instead of returning a result, the resolve graph 608 step returns a set of dependent nodes that is to be pre-calculated. This resulting set does not have to be completely accurate since the primary algorithm provides functional correctness by triggering the calculation of any dependencies that are missed.

These approaches, shown in FIG. 6, demonstrate the performance benefit of this design, as well as some of the nuance to its implementation. These are discussed below.

Performance impact of computing dependencies: as is evident, the "Resolve Graph" calculation can delay the rest of the calculation. By allowing the graph to be imperfect and aggressively caching previously resolved graphs, the Resolve Graph cost can be reduced, or avoided altogether.

Performance impact of frequently looking up records: For certain classes of algorithms or data shapes, heuristics and instrumentation can be used to determine whether or not an optimization is worth pursuing. For example there are cases when the resolved graph is not more accurate than the unresolved graph. By detecting such cases, unnecessary Resolve Graph calculations can be avoided.

Performance impact of a processing unit working on an unnecessary job: this is the core of the feature and in the example shown in FIG. 6, this cost is represented by the calculation time of "Frame B". This improvement allows the advantage of parallelism without taking longer than needed and without using up system resources that could be better used on other calculations.

Figure 7:
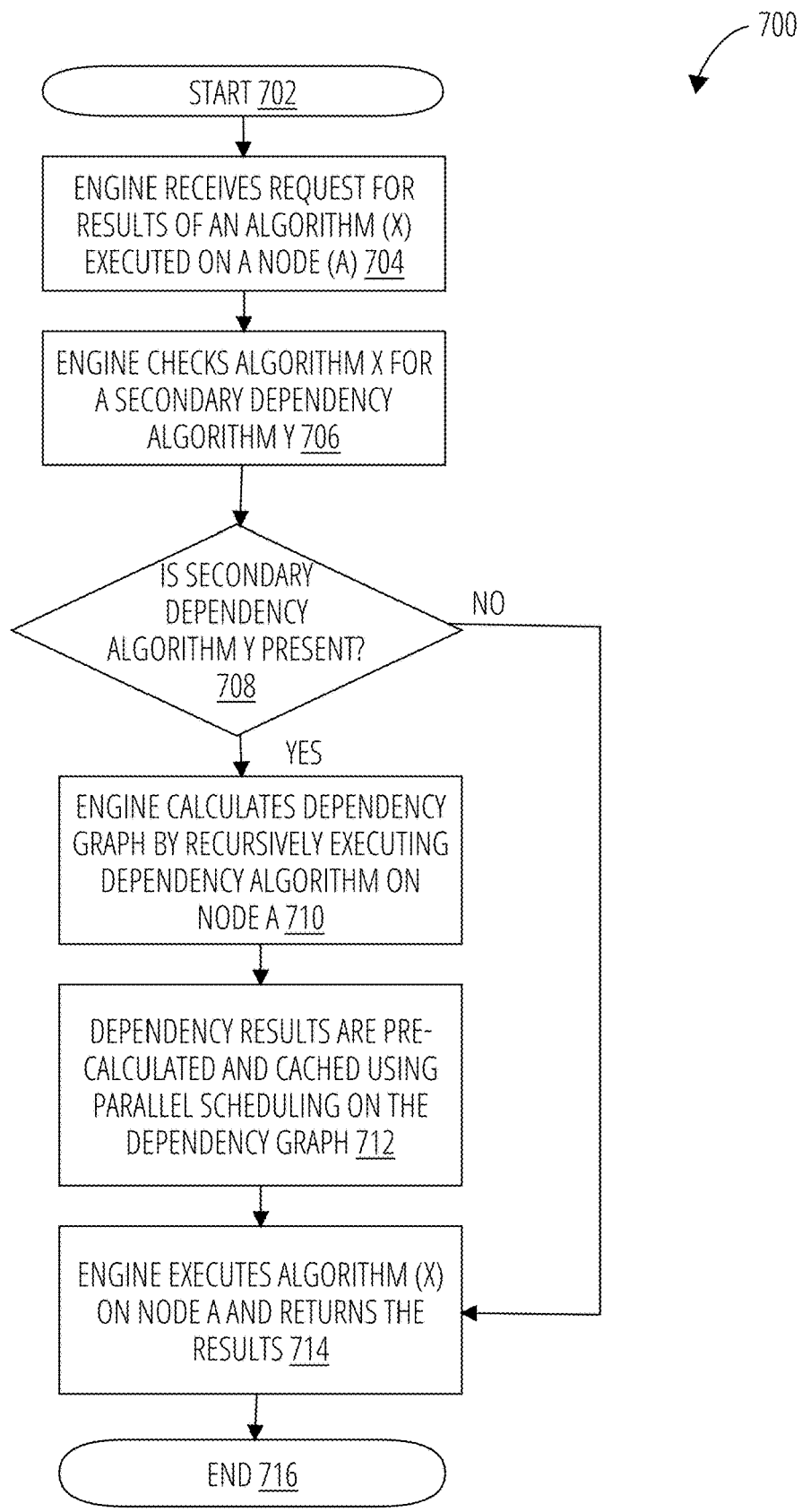
FIG. 7 illustrates a block diagram accordance with one embodiment.

FIG. 7 illustrates a block diagram 700 accordance with one embodiment.

At block 704, an analytics engine receives a request for results of a primary algorithm executed on a node. The analytics engine then checks the primary algorithm (X) for a secondary dependency algorithm (Y) at block 706, and decides on the next course of action at decision block 708. If no secondary dependency algorithm is present, then the analytics engine proceeds directly to block 714. As an example, the analytics engine can select a naïve dependency algorithm, such as that shown as Item 604 of FIG. 6.

If, however, a secondary dependency algorithm is present, then the analytics engine calculates a dependency graph by recursively executing the secondary dependency algorithm on node A at block 710. The dependency results are pre-calculated and cached using parallel scheduling on the dependency graph, at block 714.

At block 714, the analytics engine does not require dependencies to be pre-calculated. Nor does it perform any parallelism. If, during the course of calculation, it requires data from a dependency that has not yet been calculated, it will pause in order to calculate the dependency and then resume its calculation.

For example, if primary algorithm X on Node A requires the results of algorithm X on Node B, and the results for Node B have not yet been computed, then the algorithm engine will do the following: pause the execution of algorithm X on Node A; calculate the results of Algorithm X on Node B; and resume the computation of algorithm X on Node A, using the results calculated in the previous step.

The analytics engine then executes the primary algorithm (X) on Node A by calculating un-cached dependencies as needed by the primary algorithm, and returns the results.

Further to counting of nodes in FIG. 3, consider what happens if a new scenario is created in which a node 802 is added to the tree shown in FIG. 3. This results in recalculation of some of the nodes in the tree, but not all of the nodes, as shown in FIG. 8.

In some embodiments, the algorithm engine handles this automatically by requiring each algorithm to state upfront what data each may need, and invalidating results in a scenario if data is changed that the algorithm might have used. Under some circumstances, results can be shared across scenarios so that multiple scenarios are referencing the same results from the same base scenario or each other—this is a valuable capability for scenario-based planning as well as the efficiency of algorithms, since it can avoid large amounts of unnecessary recalculation. The engine also is able to handle calculations being requested simultaneously by users at any node in the graph (not just the root node), which requires non-trivial synchronization in order to avoid duplicating work.

In some embodiments, the algorithm scheduling logic is able to process calculations in parallel. In the example graph shown in FIG. 8. The recursion of the algorithm allows for the counts of node B and C to be calculated in parallel. Since data dependencies are declared up front for the algorithm, the algorithm engine is able to determine what calculations the current analytic might ask for and process these calculations in advance. This approach is referred to below as "Naïve Parallel Execution", which works well for simple cases. However, in practice, often the algorithm logic contains an implicit filter that results in only some of the possible dependent calculations being needed.

Figure 8:
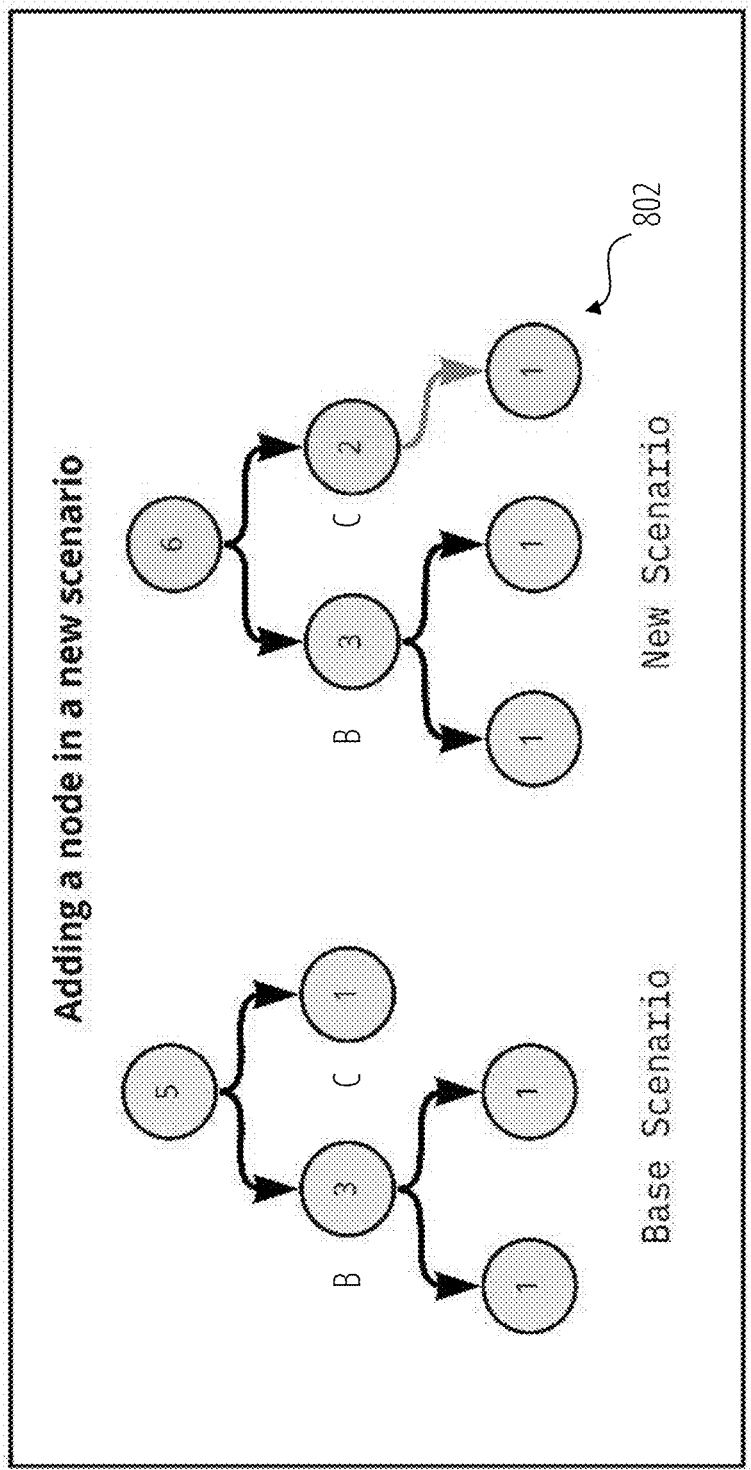
FIG. 8 illustrates adding a node in a new scenario of the tree structure shown in FIG. 3.
Figure 9:
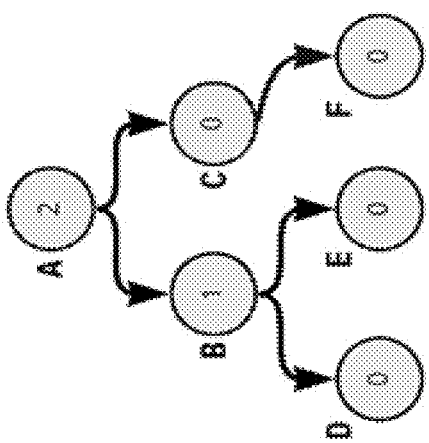
FIG. 9 illustrates recursive counting of nodes in the tree shown in FIG. 8, in accordance with one embodiment.

FIG. 9 illustrates an extension to the algorithm shown in FIG. 8. This extension only counts nodes in the dense inner part of the tree—so that if recursion occurs down from A, the recursion terminates at C so that DenseNodeCount is never called on F.

A problem that the algorithm engine runs into with this type of algorithm is that F may be pre-calculated, even though it is never going to be used. These example algorithms may be fast and trivial, but in practice, an incorrect pre-calculation can add run-time to a user's workbook execution time. The set of actually needed dependencies of a node may also change across scenarios; therefore it cannot be handled by scenario-based caching mechanisms.

A solution to this problem is to allow algorithms to provide a lightweight supplementary algorithm that the engine can use to resolve the business logic specific dependencies at runtime. The algorithm developer can have the option of defining a dependency algorithm that frees up the algorithm engine to parallel much more aggressively.

Figure 10:
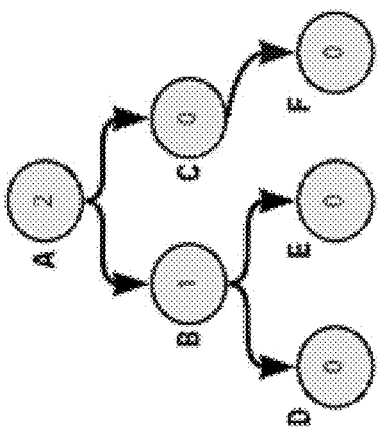
FIG. 10 illustrates recursive counting of dense nodes in accordance with one embodiment. in accordance with one embodiment.

In FIG. 10, the DenseNodeCountDependencies algorithm is a small, fast algorithm that computes just the dependencies which allows the algorithm engine to calculate the full dependency graph quickly without incurring the overhead of running the algorithm. One advantage of this approach is that it does not need to be completely accurate. If the supplementary algorithm omits a dependency that is actually needed, then the algorithm engine can easily calculate it just in time when it is needed by the primary algorithm. This allows the algorithm engine to be much more aggressive in parallel execution of dependencies, which is key for performance of high-speed algorithms.

Figure 11:
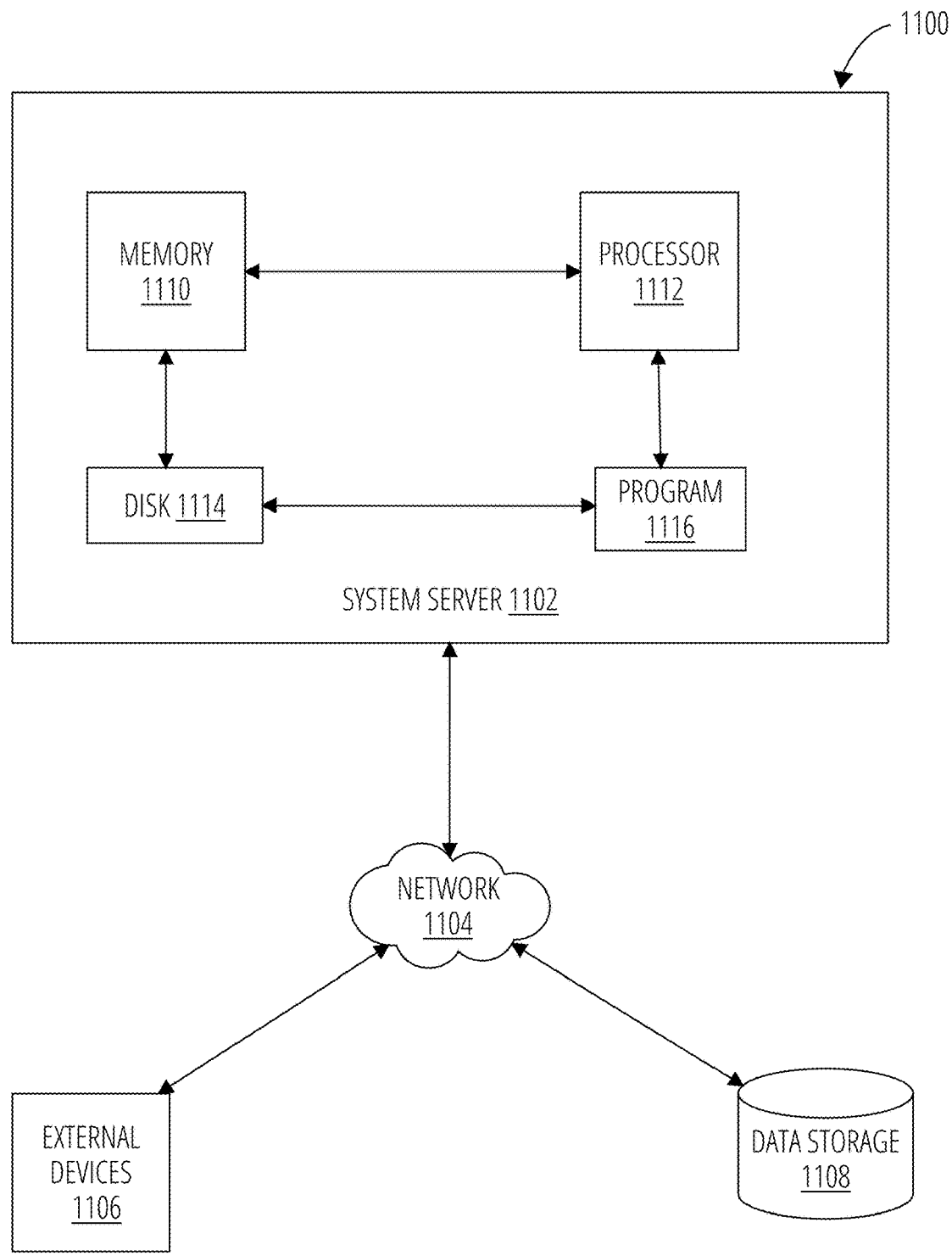
FIG. 11 illustrates a computer system in accordance with one embodiment.

FIG. 11 illustrates a system 1100 in accordance with one embodiment.

One or more embodiments of the invention, or elements thereof, can be implemented in the form of an system including a memory and at least one processor that is coupled to the memory and operative to perform exemplary method steps.

System server 1102 may be described in the general context of computer system executable instructions, such as program modules, being executed by a computer system. Generally, program modules may include routines, programs, objects, components, logic, data structures, and so on that perform particular tasks or implement particular abstract data types. system server 1102 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, system server 1102 is shown in the form of a general-purpose computing device. The components of system server 1102 may include, but are not limited to, one or more processors 1112, a memory 1110, program 1116 and disk 1114 may be coupled by a bus structure (not shown).

Program 1116 may comprise a set of program modules or an engine, which can execute functions and/or methods of embodiments of the invention as described herein.

System 1100 can also include additional features and/or functionality. For example, system 1100 can also include additional storage (removable and/or non-removable) including, but not limited to, magnetic or optical disks or tape. Such additional storage is illustrated in FIG. 11 by memory 1110 and disk 1114. Storage media can include volatile and nonvolatile, removable and non-removable media implemented in any method or technology for storage of information such as computer-readable instructions, data structures, program modules or other data. Memory 1110 and disk 1114 are examples of non-transitory computer-readable storage media. Non-transitory computer-readable media also includes, but is not limited to, Random Access Memory (RAM), Read-Only Memory (ROM), Electrically Erasable Programmable Read-Only Memory (EEPROM), flash memory and/or other memory technology, Compact Disc Read-Only Memory (CD-ROM), digital versatile discs (DVD), and/or other optical storage, magnetic cassettes, magnetic tape, magnetic disk storage or other magnetic storage devices, and/or any other medium which can be used to store the desired information and which can be accessed by system 1100. Any such non-transitory computer-readable storage media can be part of system 1100.

Communication between system server 1102, external devices 1106 and data storage 1108 via network 1104 can be over various network types. Non-limiting example network types can include Fibre Channel, small computer system interface (SCSI), Bluetooth, Ethernet, Wi-fi, Infrared Data Association (IrDA), Local area networks (LAN), Wireless Local area networks (WLAN), wide area networks (WAN) such as the Internet, serial, and universal serial bus (USB). Generally, communication between various components of system 200 may take place over hard-wired, cellular, Wi-Fi or Bluetooth networked components or the like. In some embodiments, one or more electronic devices of system 200 may include cloud-based features, such as cloud-based memory storage. It should be understood that although not shown, other hardware and/or software components could be used in conjunction with system server 1102.

While data storage 1108 is illustrated as separate from system server 1102, data storage 1108 can also be integrated into system server 1102, either as a separate component within system server 1102, or as part of at least one of memory 1110 and disk 1114.

Data storage 1108 may implement an "in-memory" database, in which volatile (e.g., non-disk-based) storage (e.g., Random Access Memory) is used both for cache memory and for storing the full database during operation, and persistent storage (e.g., one or more fixed disks) is used for offline persistency and maintenance of database snapshots. Alternatively, volatile storage may be used as cache memory for storing recently-used data, while persistent storage stores the full database.

Data storage 1108 may store metadata regarding the structure, relationships and meaning of data. This information may include data defining the schema of database tables stored within the data. A database table schema may specify the name of the database table, columns of the database table, the data type associated with each column, and other information associated with the database table. Data storage 1108 may also or alternatively support multi-tenancy by providing multiple logical database systems which are programmatically isolated from one another. Moreover, the data may be indexed and/or selectively replicated in an index to allow fast searching and retrieval thereof.

System server 1102 may also communicate with one or more external devices 1106 such as a keyboard, a pointing device, a display, etc.; one or more devices that enable a user to interact with system server 1102; and/or any devices that enable system server 1102 to communicate with one or more other computing devices.

Thus, one or more embodiments can make use of software running on a general purpose computer or workstation. With reference to FIG. 11, such an implementation might employ, for example, a processor 1112, a memory 1110, and one or more external devices 1106 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device, a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer).

Accordingly, computer software including instructions or code for performing methods as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 1112 coupled directly or indirectly to memory 1110. The memory elements can include local memory employed during actual implementation of the program code, bulk storage, and cache memories which provide temporary storage of at least some program code in order to reduce the number of times code must be retrieved from bulk storage during implementation.

As used herein, including the claims, a "server" includes a physical data processing system (for example, system server 1102 as shown in FIG. 11) running a server program. It will be understood that such a physical server may or may not include a display and keyboard.

One or more embodiments can be at least partially implemented in the context of a cloud or virtual machine environment, although this is exemplary and non-limiting.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 1112. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method for an analytics engine comprising:

computing, by a processor, a full dependency graph before obtaining a result of an analytic, the full dependency graph comprising a plurality of nodes and threads, where every node in the full dependency graph is an executable unit and at least some of the plurality of nodes depend on data from another of the plurality of nodes in order to compute a metric at the given node, and each of the threads of the full dependency graph is a separate processing unit the analytics engine iterates over as a graph edge;

constructing, by the processor, a scheduling graph from the full dependency graph to optimally distribute work between available threads of the full dependency graph;

receiving, by the processor, a request for a result of an algorithm executed on the given node;

checking, by the processor, the algorithm for a secondary dependency algorithm;

calculating, by the secondary dependency algorithm graph by recursively executing the secondary dependency algorithm on the given node; and parallel scheduling, by the processor, on the secondary dependency algorithm graph to pre-calculate dependency results;

caching, by the processor, the pre-calculated dependency results; and executing, by the processor, the algorithm on the given node based on the scheduling graph.

2. The computer-implemented method of claim 1, wherein executing the algorithm on the given node comprises:

calculating, by the processor, un-cached dependencies by the algorithm.

3. A system comprising:

a processor for an analytics engine; and a memory storing instructions that, when executed by the processor, configure the system to:

compute, by the processor, a full dependency graph before obtaining a result of an analytic the full dependency graph comprising a plurality of nodes where each node in the full dependency graph is an executable unit and at least some of the plurality of nodes depend on data from another of the plurality of nodes in order to compute a metric at a given node;

construct, by the processor, a scheduling graph from the full dependency graph to optimally distribute work between available threads of the full dependency graph, each of the threads of the full dependency graph being a separate processing unit the analytics engine iterates over;

receive, by the processor, a request for a result of an algorithm executed on the given node;

check, by the processor, the algorithm for secondary dependency algorithm;

calculate, by the processor, a secondary dependency algorithm graph by recursively executing the dependency algorithm on the given node; and parallel schedule, by the processor on the secondary dependency algorithm graph to pre-calculate dependency results;

cache, by the processor the precalculated dependency results; and execute, by the processor, the algorithm on the given node based on the scheduling graph.

4. The system of claim 3, wherein in executing the algorithm on the given node, the system is further configured to:

calculate, by the processor, un-cached dependencies by the algorithm.

5. A non-transitory computer-readable storage medium, the computer-readable storage medium including instructions that when executed by a computer, cause the computer to:

compute, by a processor of an analytics engine, a full dependency graph before obtaining a result of an analytic, the full dependency graph comprising a plurality of nodes and threads, where each node in the full dependency graph is an executable unit and at least some of the plurality of nodes depend on data from another of the plurality of nodes in order to compute a metric at a given node, and each of the threads of the full dependency graph is a separate processing unit the analytics engine iterates over as a graph edge; and construct, by the processor, a scheduling graph from the full dependency graph to optimally distribute work between available threads of the full dependency graph;

receive, by the processor, a request for a result of an algorithm executed on the given node;

check, by the processor, the algorithm for a secondary dependency algorithm;

calculate, by the processor, a secondary dependency algorithm graph by recursively executing the dependency algorithm on the given node; and parallel schedule, by the processor on the secondary dependency algorithm graph to pre-calculate dependency results;

cache, by the processor, the pre-calculated dependency results; and executing, by the processor, the algorithm on the given node based on the scheduling graph.

6. The non-transitory computer-readable storage medium of claim 5, wherein the instructions for executing the algorithm on the given node, further cause the computer to:

calculate, by the processor, un-cached dependencies by the algorithm.

* * * * *